United States Patent
Mayorga

(10) Patent No.: US 10,690,284 B2
(45) Date of Patent: Jun. 23, 2020

(54) TRACK SYSTEM FOR IMAGE CAPTURE DEVICES

(71) Applicant: Benjamin Mayorga, Penn Valley, CA (US)

(72) Inventor: Benjamin Mayorga, Penn Valley, CA (US)

( * ) Notice: Subject to any disclaimer, the term of this patent is extended or adjusted under 35 U.S.C. 154(b) by 20 days.

(21) Appl. No.: 15/934,577

(22) Filed: Mar. 23, 2018

(65) Prior Publication Data

US 2019/0293231 A1  Sep. 26, 2019

(51) Int. Cl.
*G03B 17/56* (2006.01)
*F16M 11/42* (2006.01)

(52) U.S. Cl.
CPC ......... *F16M 11/425* (2013.01); *G03B 17/561* (2013.01)

(58) Field of Classification Search
CPC .................................................... F16M 11/415
See application file for complete search history.

(56) References Cited

U.S. PATENT DOCUMENTS

| | | | | |
|---|---|---|---|---|
| 3,598,355 A * | 8/1971 | English | ............ | F16M 11/10 248/178.1 |
| 6,752,541 B1 * | 6/2004 | Dykyj | ............ | B66F 11/048 248/123.11 |
| 8,506,180 B2 * | 8/2013 | Brown | ............ | F16M 13/04 248/187.1 |
| 8,721,199 B1 * | 5/2014 | Hart | ............ | F16M 11/045 396/428 |
| 8,973,505 B2 * | 3/2015 | Hurd | ............ | F16M 11/18 104/165 |
| 9,482,386 B2 * | 11/2016 | Balmer | ............ | G03B 17/561 |

OTHER PUBLICATIONS

Kramerar, kameravideo, "All New Designed Kamerar SLD-230/470 Mark II Sliders" Dec. 14, 2014, 1:32 minutes video, Youtube, [retrievedon Dec. 28, 2018]. Retrievedfrom the Internet URL: https://www.youtube.com/watch?v=MapCJZcfH7E (Year: 2014).*
Kamerar, "S-23 Video Camera 23" Slider Mark II" Nov. 6, 2016, kamerar.com, [retrieved on Dec. 28, 2018]. Retrieved from the Wayback Machine URL: https://web.archive.org/web/20161106110724/http://kamerar.com:80/products/s-23-video-camera-23- (Year: 2016).*

* cited by examiner

*Primary Examiner* — Clayton E. LaBalle
*Assistant Examiner* — Dennis Hancock
(74) *Attorney, Agent, or Firm* — Roy L. Chan, A Professional Law Corporation; Roy L. Chan

(57) ABSTRACT

A track system for image capture devices is utilized to shoot fast action at high frame rates for smooth slow motion playback. The results are visual impressions of detaching time and space of viewers from that of their visible subject. The system includes a track, a carriage, a handle, a first retractor, and a release mechanism. The release mechanism includes a trigger, actuator, and a pin. When the user is ready to capture fast action images and/or videos of the target subject, the user pulls the trigger, which in communication with the actuator which causes the pin to disengage from a pin aperture. In turn, the carriage is released to slide along the track.

9 Claims, 9 Drawing Sheets

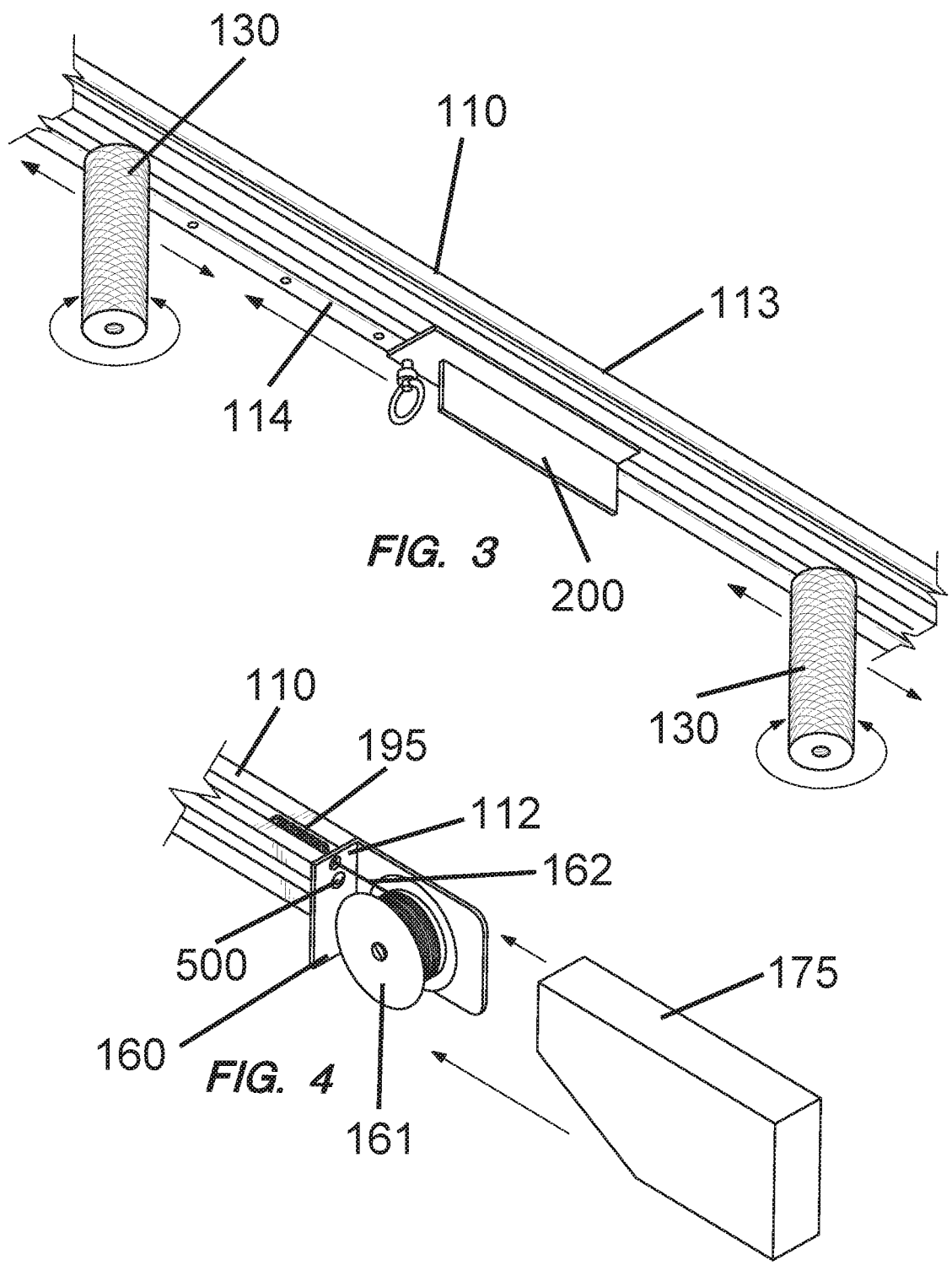

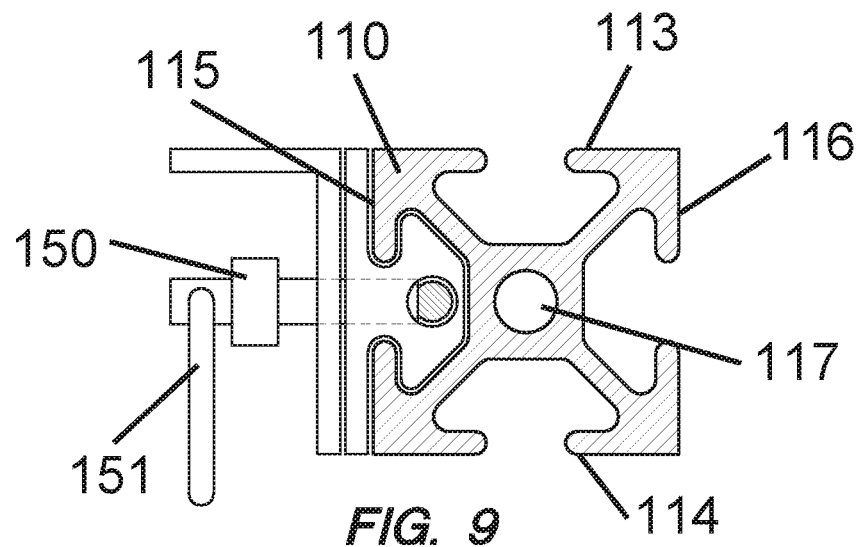
FIG. 9
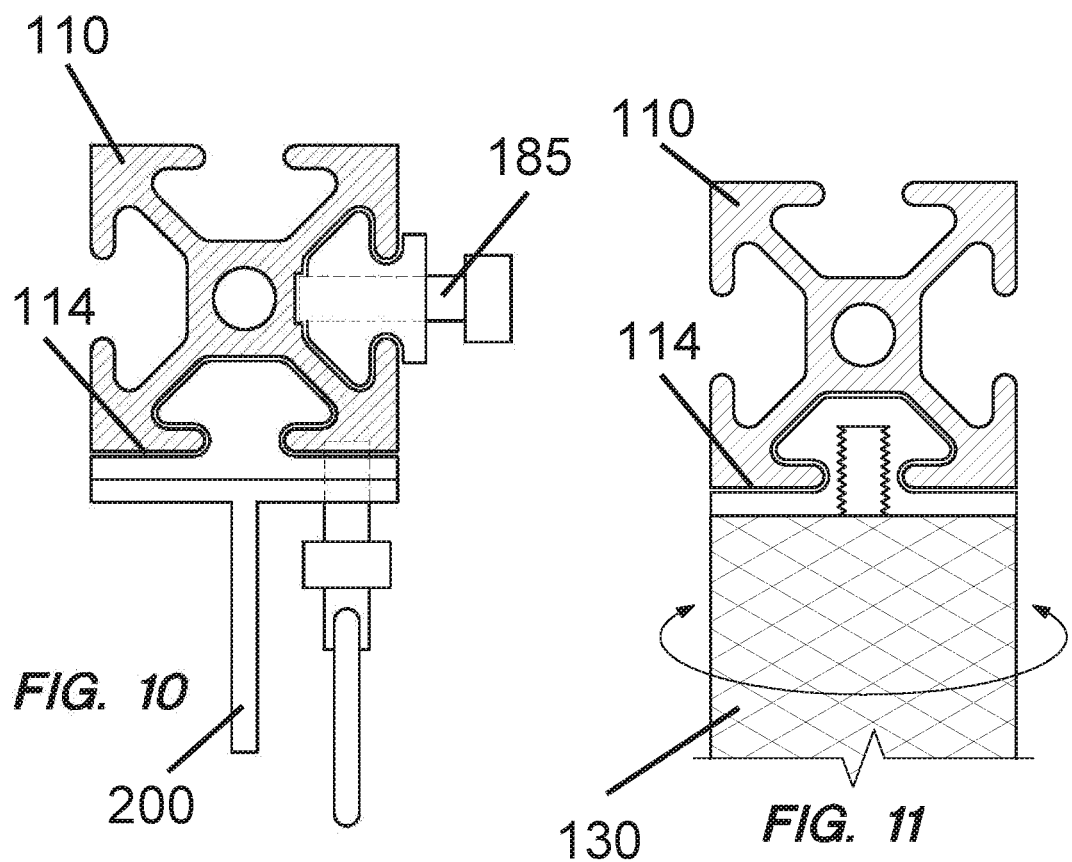
FIG. 10
FIG. 11

TRACK SYSTEM FOR IMAGE CAPTURE DEVICES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is related to a track system for use with image capture devices (ICD). An ICD may be mounted on the present invention to facilitate its movement along the track to capture images (still images and videos). For example, the present invention may be utilized to shoot fast action at high frame rates for smooth slow motion playback. The results are visual impressions of detaching time and space of viewers from that of their visible subject. Generally, this is achieved through an array of many cameras and specialized edited techniques. The present inventions is more efficient as it requires only a single camera.

BRIEF SUMMARY OF THE INVENTION

An object of the present invention is a track system for image capture devices comprising a track, a carriage, at least one handle, a first retractor, and a release mechanism. The track comprises a first end, a second end, a top side, a bottom side, a left side, and a right side. The carriage has a front end, a back end, and a pin aperture. The first retractor has a first reel and a first cable. The release mechanism has a trigger, an actuator, and a pin. The first retractor is attached to the first end. The first cable is attached to the front end. The pin aperture is configured to receive the pin. The carriage is movably attached to the top side. The carriage is configured to attach an image capturing device. The at least one handle is adjustably attached to the track. The trigger is adjustably attached to the track.

In another object of the present invention, the track system for image capture devices further comprises a second retractor. The second retractor has a second reel and a second cable. The second retractor is attached to the second end. The second cable is attached to the back end.

In yet another object of the present invention, the track system for image capture devices further comprises a first end cap and a second end cap. The first end cap is removably attached to the first end. The second end cap is removably attached to the second end.

In another object of the present invention, the track system for image capture devices further comprises a folding hinge and locking mechanism.

In yet another object of the present invention, the track system for image capture devices further comprises a first damper and a second damper.

In another object of the present invention, the track further comprises a center channel.

In yet another object of the present invention, the at least one handle is adjustably attached to the bottom side.

In another object of the present invention, the trigger is adjustably attached to the track.

In yet another object of the present invention, the trigger is adjustably attached to the left side.

In another object of the present invention, the track system for image capture devices further comprises a remote mount. The remote mount is adjustably attached to the track.

In yet another object of the present invention, the remote mount is adjustably attached to the bottom side.

BRIEF DESCRIPTION OF THE SEVERAL VIEWS OF THE DRAWING

The advantages and features of the present invention will be better understood as the following description is read in conjunction with the accompanying drawings, wherein:

FIG. 3 is a partial view of an embodiment of the invention,

FIG. 4 is a partial view of an embodiment of the invention.

FIG. 9 is a cross-sectional view (9-9) of an embodiment of the invention.

FIG. 10 is a cross-sectional view (10-10) of an embodiment of the invention.

FIG. 11 is a cross-sectional view (11-11) of an embodiment of the invention.

Figure 1:
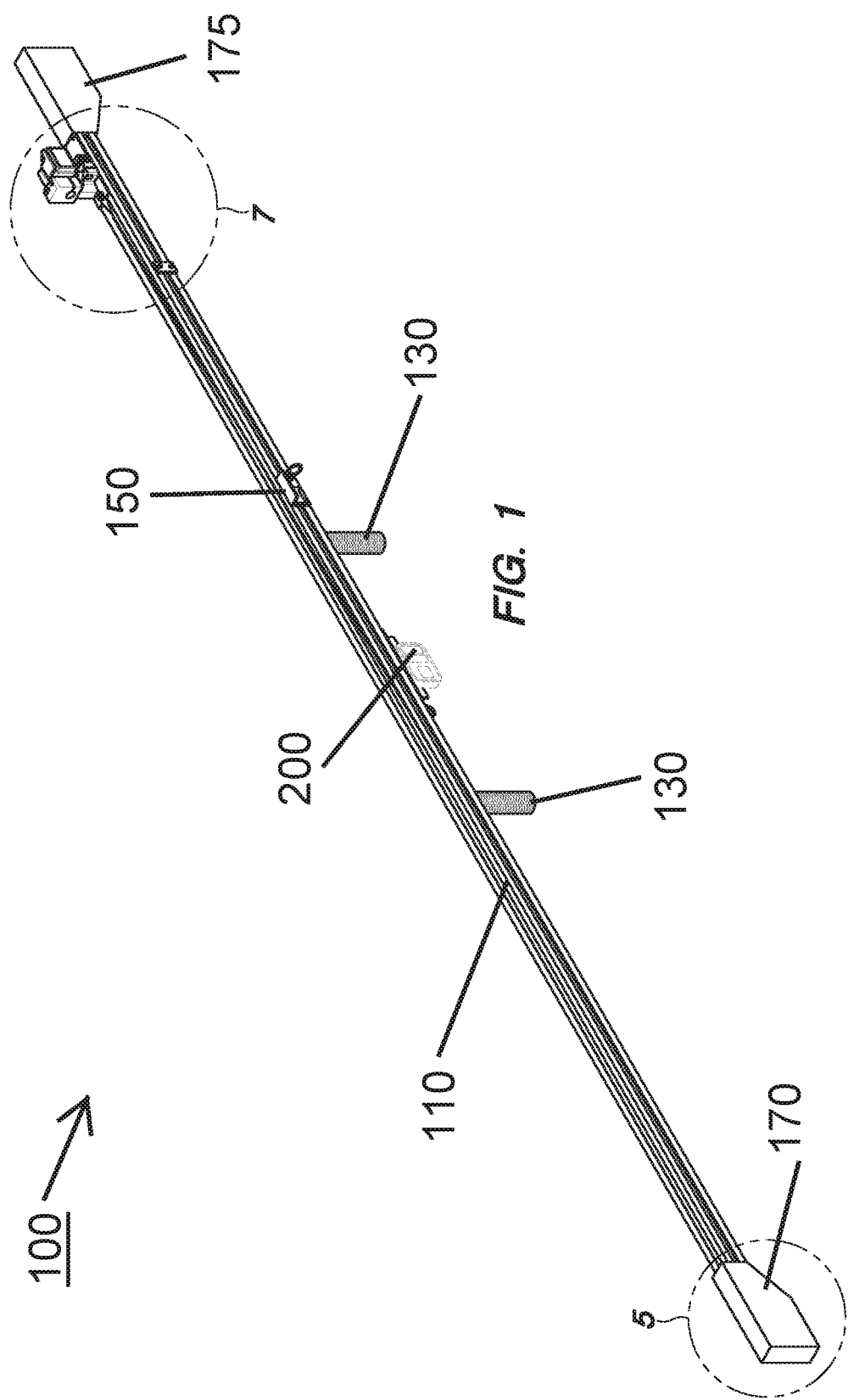
FIG. 1 is a perspective view of an embodiment of the invention.

For clarity purposes, all reference numerals may not be included in every figure.

DETAILED DESCRIPTION OF THE INVENTION

As illustrated in the figures, a track system for image capture devices 100 comprising a track 110, a carriage 120, at least one handle 130, a first retractor 140, and a release mechanism 150. The track 110 comprises a first end 111, a second end 112, a top side 113, a bottom side 114, a left side 115, and a right side 116. The carriage 120 has a front end 121, a back end 122, and a pin aperture 123. The first retractor 140 has a first reel 141 and a first cable 142, The release mechanism 150 has a trigger 151, an actuator 152, and a pin 153. The first retractor 140 is attached to the first end 111. The first cable 142 is attached to the front end 121, The pin aperture 123 is configured to receive the pin 153.

The carriage 120 is movably attached to the top side 113. The carriage 120 is configured to attach an image capturing device 350. The at least one handle 130 is adjustably attached to the track 110, The trigger 151 is adjustably attached to the track 110.

In some embodiments, as illustrated in FIG. 4, the track system for image capture devices 100 may further comprise a second retractor 160, The second retractor 160 has a second reel 161 and a second cable 162. The second retractor 160 is attached to the second end 112. The second cable 162 is attached to the back end 122. After the carriage 120 moves along the track 110 towards the first end 111, the second retractor 160 may facilitate the carriage's 120 movement back towards the second end 112. The second retractor 160 may aid in controlling and regulating the speed of the carriage 120 as it moves along the track 110.

The first reel 141 of the first retractor 140 may have a mechanical spring that retracts the first cable 142, when the first cable 142 is extended, then released. Similarly, second reel 161 of the second retractor 160 may have a mechanical spring that retracts the second cable 162, when the second cable 162 is extended, then released.

Figure 5:
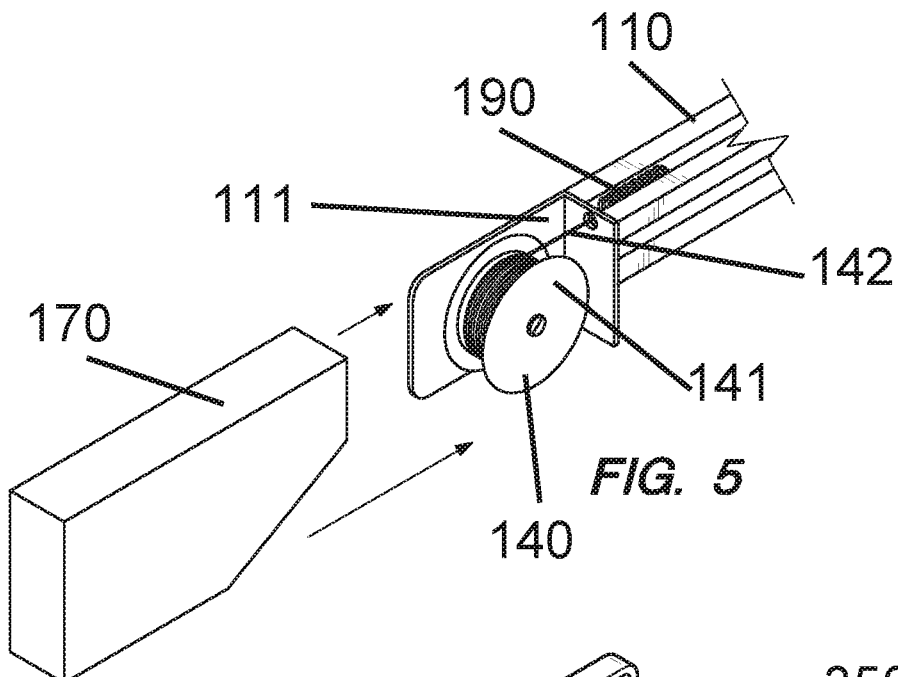
FIG. 5 is a partial view of an embodiment of the invention.

In other embodiments, the track system for image capture devices 100 may further comprise a first end cap 170 and a second end cap 175, as illustrated in FIGS. 4 and 5. The first end cap 170 is removably attached to the first end 111, and the second end cap 175 is removably attached to the second end 112. The first end cap 170 may serve to protect the first retractor 140, and the second end cap 175 may serve to protect the second retractor 160.

Figure 12:
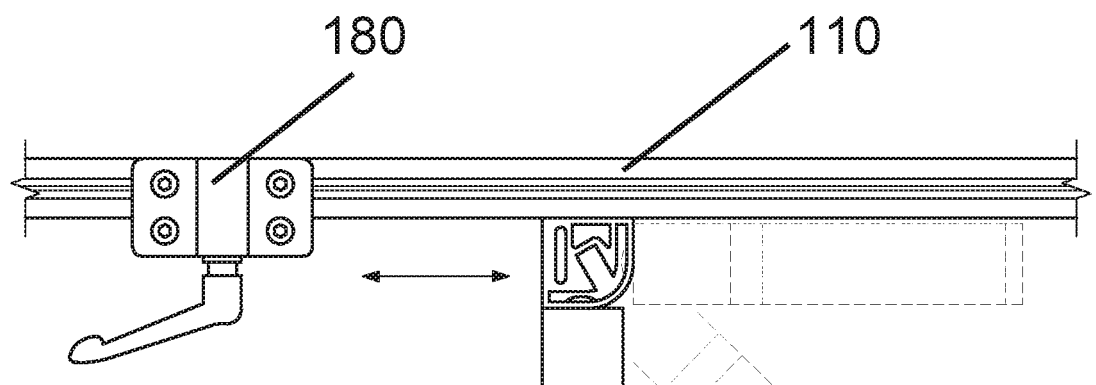
FIG. 12 is a partial view of an embodiment of the invention.
Figure 13:
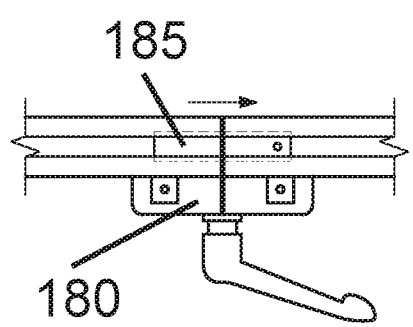
FIG. 13 is a partial view of an embodiment of the invention.
Figure 14:
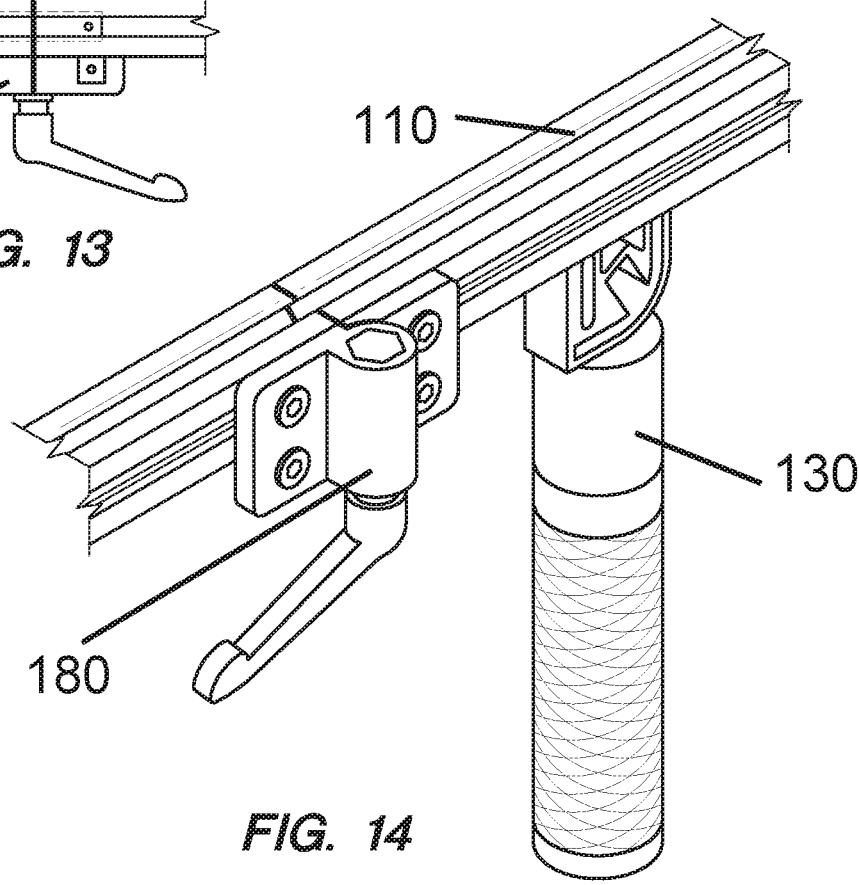
FIG. 14 is a partial view of an embodiment of the invention.
Figure 16:
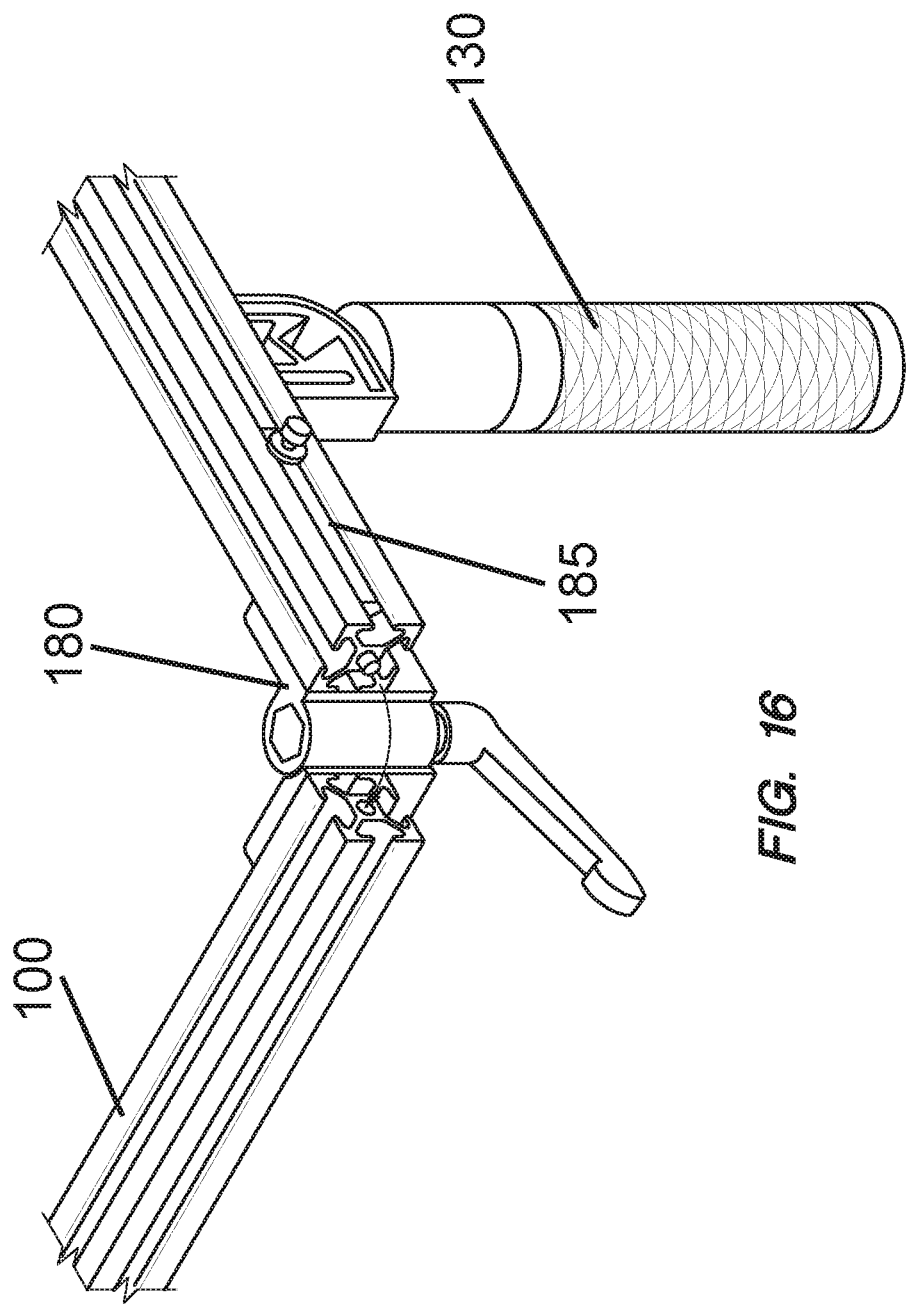
FIG. 16 is a partial view of an embodiment of the invention.

As illustrated in FIGS. 12, 13 and 14, some embodiments of the track system for image capture devices 100 may further comprise a folding hinge 180 and a locking mechanism 185. The folding hinge 180 allows the track system for image capture devices 100 to be folded for ease of transport and storage. The exemplary figures illustrate that the folding hinge 180 may have a locking mechanism 185 to lock the track system for image capture devices 100 in either a folded or an extended position. As illustrated in FIG. 10, the locking mechanism 185 may be a spring-loaded pull pin, or, as illustrated in FIGS. 13 and 16, the locking mechanism 185 may be a sliding lock. In other embodiments, the locking mechanism 185 may be a combination of a sliding lock with a spring-loaded pull pin.

In some embodiments, the track system for image capture devices 100 may further comprise a first damper 190 and a second damper 195, as illustrated in FIGS. 4 and 5. As the carriage 120 moves along the track 110 towards the first end 111, the first damper 190 cushions the carriage 120 as it reaches the first end 111. Similarly, as the carriage 120 moves along the track 110 towards the second end 112, the second damper 195 cushions the carriage 120 as it reaches the second end 112. Although the figures illustrate the first damper 190 and the second damper 195 as springs, any suitable dampening or cushioning material may be utilized, such as foam, cork, or any other dampening material known to one skilled in the art.

In other embodiments, the track 110 may further comprise a center channel 117, as illustrated in FIGS. 9, 10 and 11. In embodiments with a center channel 117, the center channel 117 may serve several purposes. For example, as illustrated in FIG. 4, the second retractor 160 may be attached to the second end 112 with a screw 500 that is secured to the center channel 117. Similarly, the first retractor 140 may be attached to the first end 111 with a screw 500 that is secured to the center channel 117. As illustrated in FIG. 16, in embodiments where the track 110 may be folded, the center channel 117 may have a pin in one part of the track 110 that fits into the opening of the other part of the track's center channel 117 when the track 110 is extended.

Figure 15:
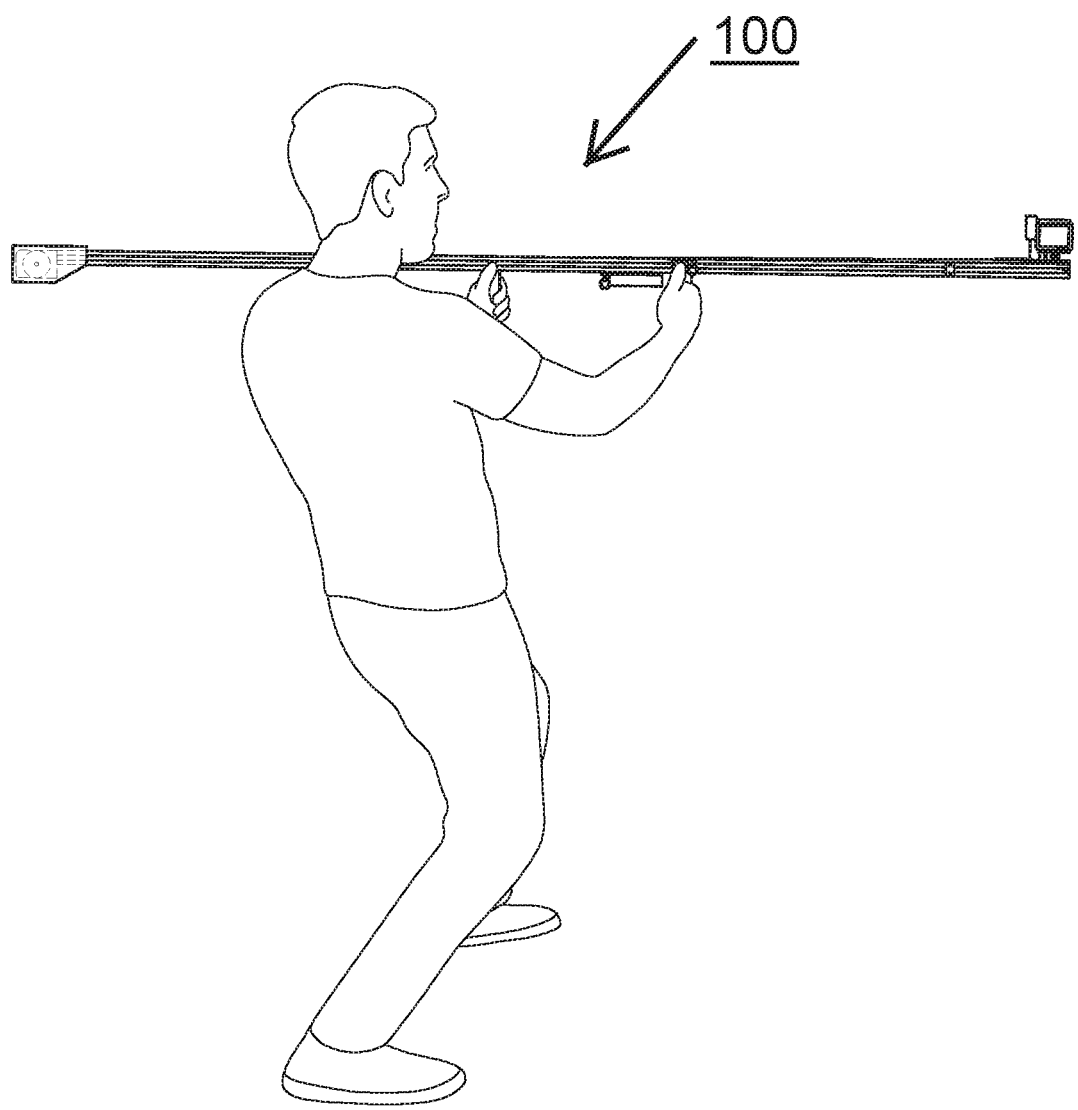
FIG. 15 is a perspective view of an embodiment of the invention.

In some embodiments, the handle 130 is adjustably attached to the bottom side 114. As illustrated in FIGS. 3 and 11, the handle 130 may be loosened by rotation and moving the handle 130 along the bottom side 114, and then tightened by rotation at a different location along the bottom side 114. As illustrated in FIG. 12, the handle 130 may be pivoted towards the track 100 for transportation and storage purposes. Furthermore, the handle 130 may be configured to accept a tripod. Additionally, as illustrated in FIG. 15, when a user holds the handles 130, both handles may be positioned along the bottom side 114, Alternatively, one handle 130 may be positioned along the bottom side 114, while another handle 130 may be positioned along the left side 115, The handles 130 may be positioned for the comfort of the user. The handles 130 may be positioned on any side of the track 110, except the side that the carriage 120 is positioned. Additionally, the handles 130 may have rubber grips or be textured to aid the user in holding the handles 130.

In other embodiments, the trigger 151 is adjustably attached to the track 110. As illustrated in FIG. 9, the trigger 151 may be adjusted by pulling a spring-loaded pin away from the left side 115 to disengage the spring-loaded pin, then slide the trigger 151 to the desired location of the track 110, By releasing the spring-loaded pin, the spring-loaded pin then re-engages the track 110 at the desired location. The trigger 151 may be positioned on any side of the track 110, except the side that the carriage 120 is positioned. As illustrated in FIG. 15, the user may prefer the trigger 151 to be positioned near one of the handles 130 to allow the ease of discharging the release mechanism 150, Preferably, the trigger 151 is adjustably attached to the left side 115, Although the figure and description refer to the trigger 151 being adjustably attached to the left side 115, the scope of the present invention and claims may have the trigger 151 on the right side 116, The choice of side may be more convenient and based upon whether the user is right-handed or left-handed.

Figure 2:
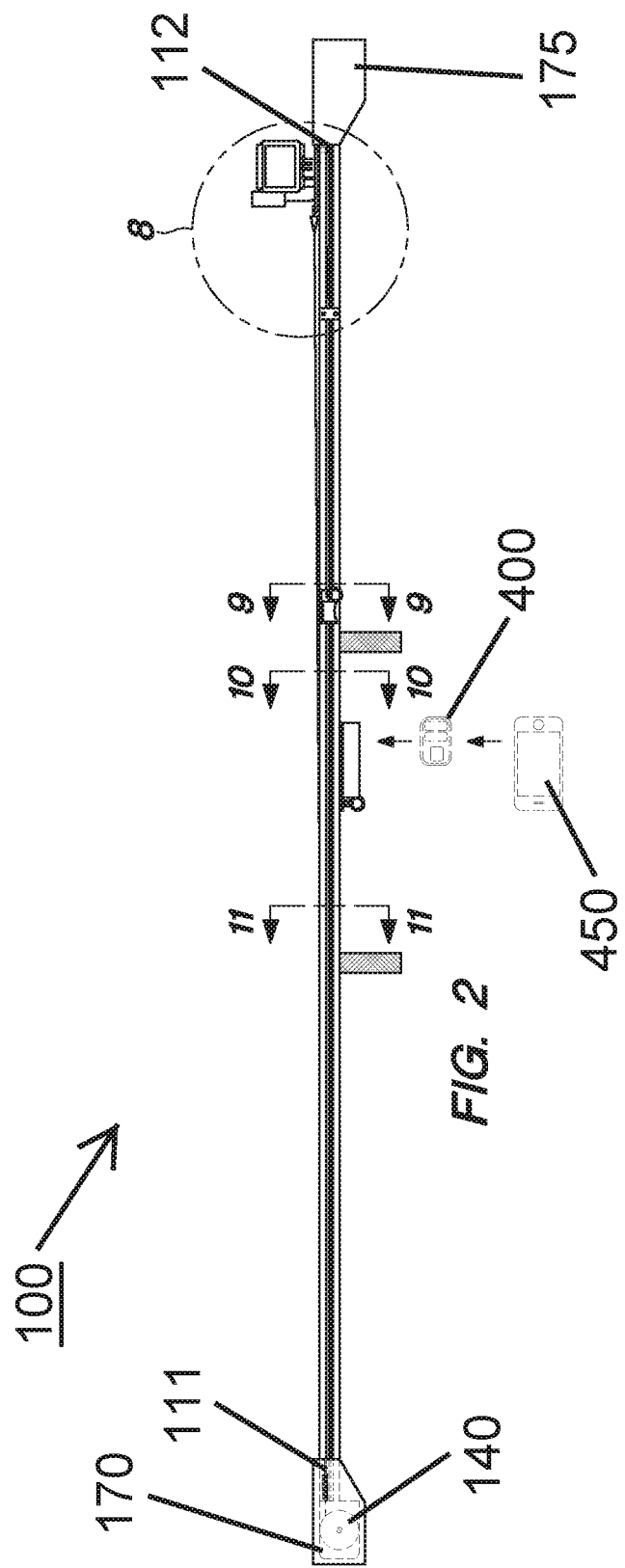
FIG. 2 is a side view of an embodiment of the invention.

In some embodiments, the track system for image capture devices 100 may further comprise a remote mount 200. The remote mount 200 is adjustably attached to the track 110. As illustrated in FIG. 10, the remote mount 200 may be adjusted by pulling a spring-loaded pin away from the bottom side 114 to disengage the spring-loaded pin, then slide the remote mount 200 to the desired location of the track 110. By releasing the spring-loaded pin, the spring-loaded pin then re-engages the track 110 at the desired location. The remote mount 200 may be positioned on any side of the track 110, except the side that the carriage 120 is positioned. As illustrated in FIG. 15, the user may prefer the remote mount 200 to be positioned near one of the handles 130 to allow the ease of controlling the image capturing device 350. Preferably, the image capturing device is adjustably attached to the bottom side 114. As illustrated in FIG. 2, the remote mount 200 may be configured to attach to a remote holder 400 and a remote 450, which may be used to control the image capturing device 350.

Figure 6:
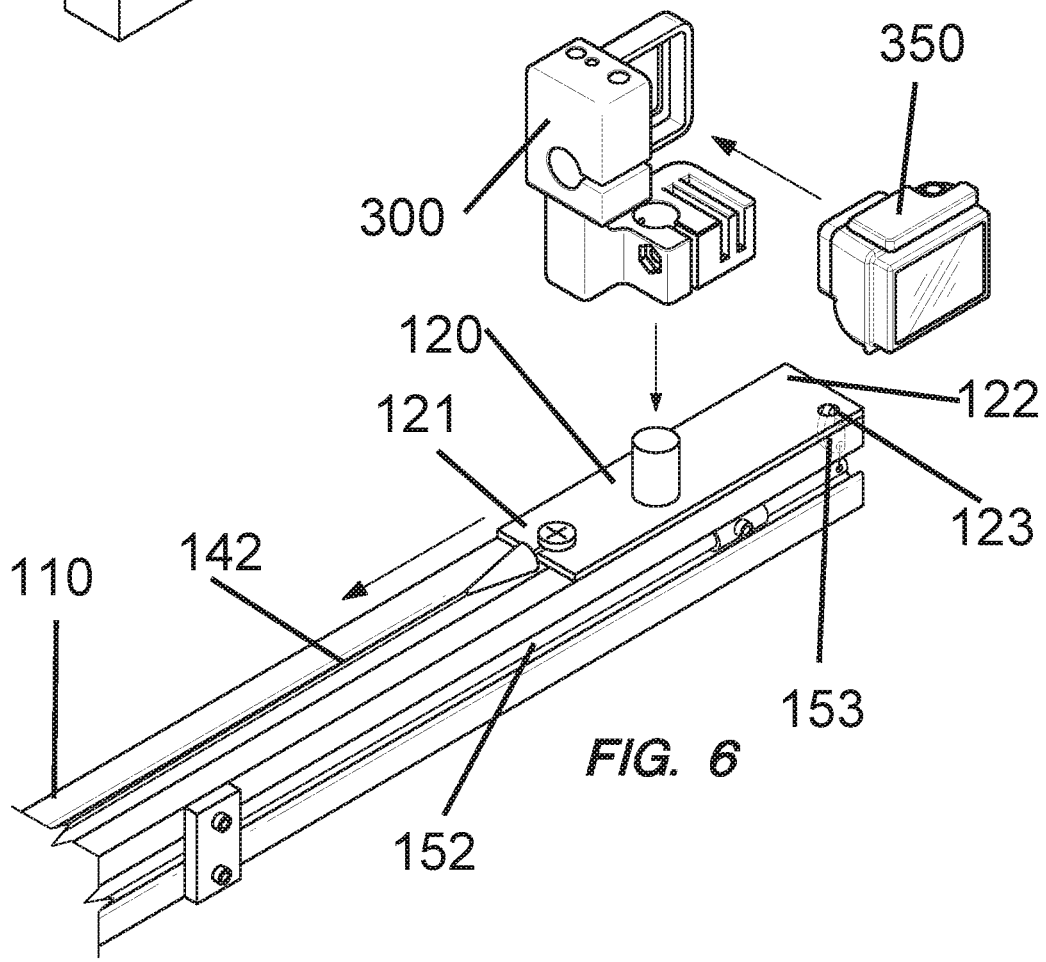
FIG. 6 is a partial view of an embodiment of the invention.
Figure 7:
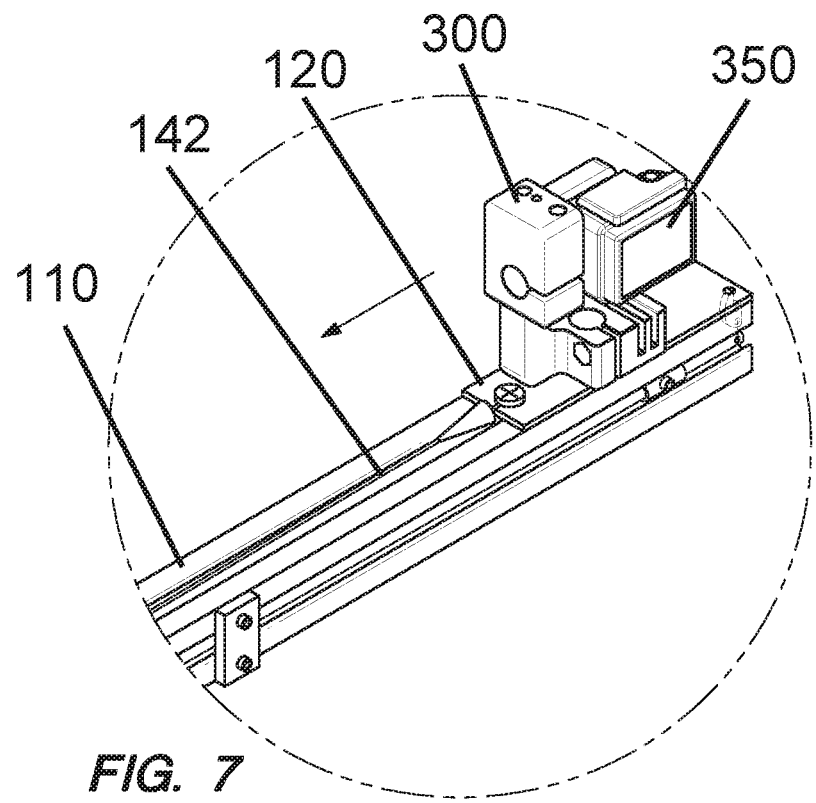
FIG. 7 is a partial view of an embodiment of the invention.

As illustrated in FIG. 6, the carriage 120 may be configured to attach to an image capturing device holder 300. The image capturing device holder 300 then holds the image capturing device 350. Alternatively, the carriage 120 may be configured to attach to the image capturing device 350 directly, without the image capturing device holder 300. The image capturing device 350 may be any device that is used to record images and/or videos, such as a camera.

Figure 8:
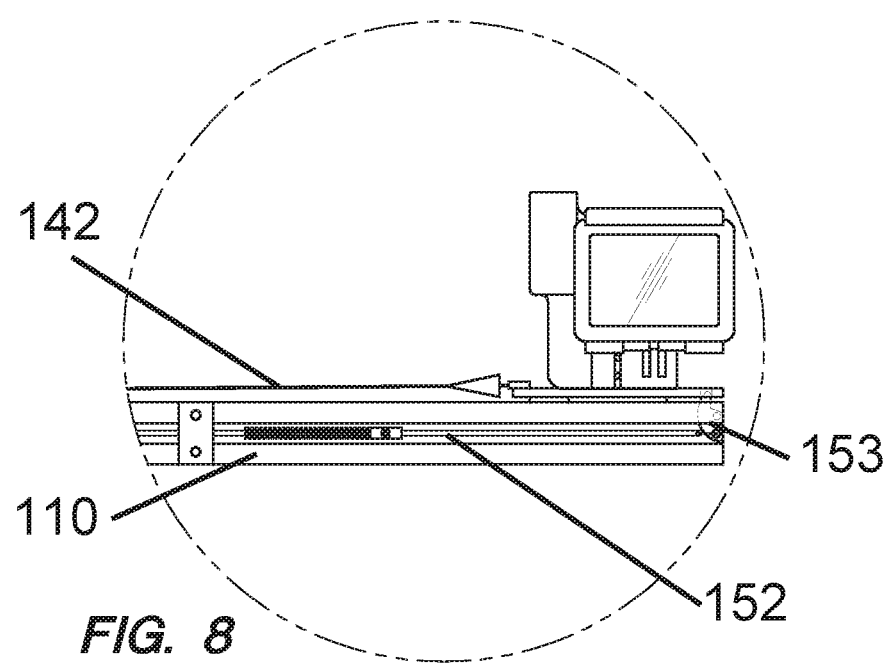
FIG. 8 is a partial view of an embodiment of the invention.

The release mechanism 150 may include a trigger 151, an actuator 152 and a pin 153. The actuator 152 may be an resilient rod that facilitates the release mechanism 150. For example, the actuator 152 may be a resilient cord or rod, as illustrated in FIG. 6. Alternatively, as another example, the actuator 152 may be a combination of a rod or cord with a spring; as another example, the actuator 152 may be a combination of a resilient rod or cord with a spring, as shown in FIG. 8.

As an example of the use of the track system for image capture devices 100, a user cocks the release mechanism 150, whereby the carriage 120 is loaded on the second end 112, as illustrated in FIGS. 1 and 2, and the pin 153 engages the pin aperture 123, as illustrated in FIG. 6. Additionally, the first cable 142, which is connected to the first end 111, is extended, causing tension in the first retractor 140. The user holds the track system for image capture devices 100, as illustrated in FIG. 15, and points the image capturing device 350 at the target subject. The user may activate or start the image capturing device 350 at any time, either directly or with the remote 450. When the user is ready to capture fast action images and/or videos of the target subject, the user pulls the trigger 151, which in communication with the actuator 152 which causes the pin 153 to disengage from the pin aperture 123. The first retractor 140 then retracts the first cable 142, which causes the carriage 120 to slide along the top side 113 of the track 110, while the image capturing device 350 is recording fast action images or videos of the target subject. At the conclusion, the user then may deactivate or stop the image capture device 350, either directly or with the remote 450.

The track system for image capture devices 100 may be made of super-light and strong materials, including, but not limited to, nylon, aluminum, stainless steel, carbon fiber, other suitable materials known to one skilled in the art, and combinations thereof.

While the invention has been described with reference to exemplary embodiments, it will be understood by those skilled in the art that various changes, omissions, and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc, do not denote any order or importance, but rather the terms first, second, etc. are used to distinguish one element from another.

I claim:

1. A track system for image capture devices comprising:
   a track, wherein the track comprises:
   a first end;
   a second end;
   a top side;
   a bottom side;
   a left side; and,
   a right side;
   a carriage, wherein the carriage comprises:
   a front end;
   a back end; and,
   a pin aperture;
   at least one handle;
   a first retractor, wherein the first retractor comprises:
   a first reel; and,
   a first cable; and,
   a release mechanism, wherein the release mechanism comprises:
   a trigger;
   an actuator;
   a pin; and;
   a remote mount;
   wherein the remote mount is adjustably attached to the track;
   wherein the first retractor is attached to the first end;
   wherein the first cable is attached to the front end;
   wherein the pin aperture is configured to receive the pin;
   wherein the carriage is movably attached to the top side;
   wherein the carriage is configured to attach an image capturing device;
   wherein the at least one handle is adjustably attached to the track; and,
   wherein the trigger is adjustably attached to the track.

2. The track system for image capture devices of claim 1 further comprising:
   a second retractor, wherein the second retractor has a second reel and a second cable;
   wherein the second retractor is attached to the second end; and,
   wherein the second cable is attached to the back end.

3. The track system for image capture devices of claim 1 further comprising:
   a first end cap; and,
   a second end cap;
   wherein the first end cap is removably attached to the first end; and,
   wherein the second end cap is removably attached to the second end.

4. The track system for image capture devices of claim 1 further comprising:
   a folding hinge, and,
   a locking mechanism.

5. The track system for image capture devices of claim 1, wherein the track further comprises a center channel.

6. The track system for image capture devices of claim 1, wherein the at least one handle is adjustably attached to the bottom side.

7. The track system for image capture devices of claim 1, wherein the trigger is adjustably attached to the left side.

8. The track system for image capture devices of claim 1, wherein the remote mount is adjustably attached to the bottom side.

9. The track system for image capture devices of claim 1 further comprising:
   a first damper; and
   a second damper.

* * * * *